April 24, 1962     H. O. KOPLIN     3,031,223
VEHICLE BODY WITH FORWARD SLIDING WINDSHIELD
AND SIDE WINDOW STRUCTURE
Filed Oct. 20, 1958     4 Sheets-Sheet 1

INVENTOR.
Hans O. Koplin
BY
W. S. Pettigrew
ATTORNEY

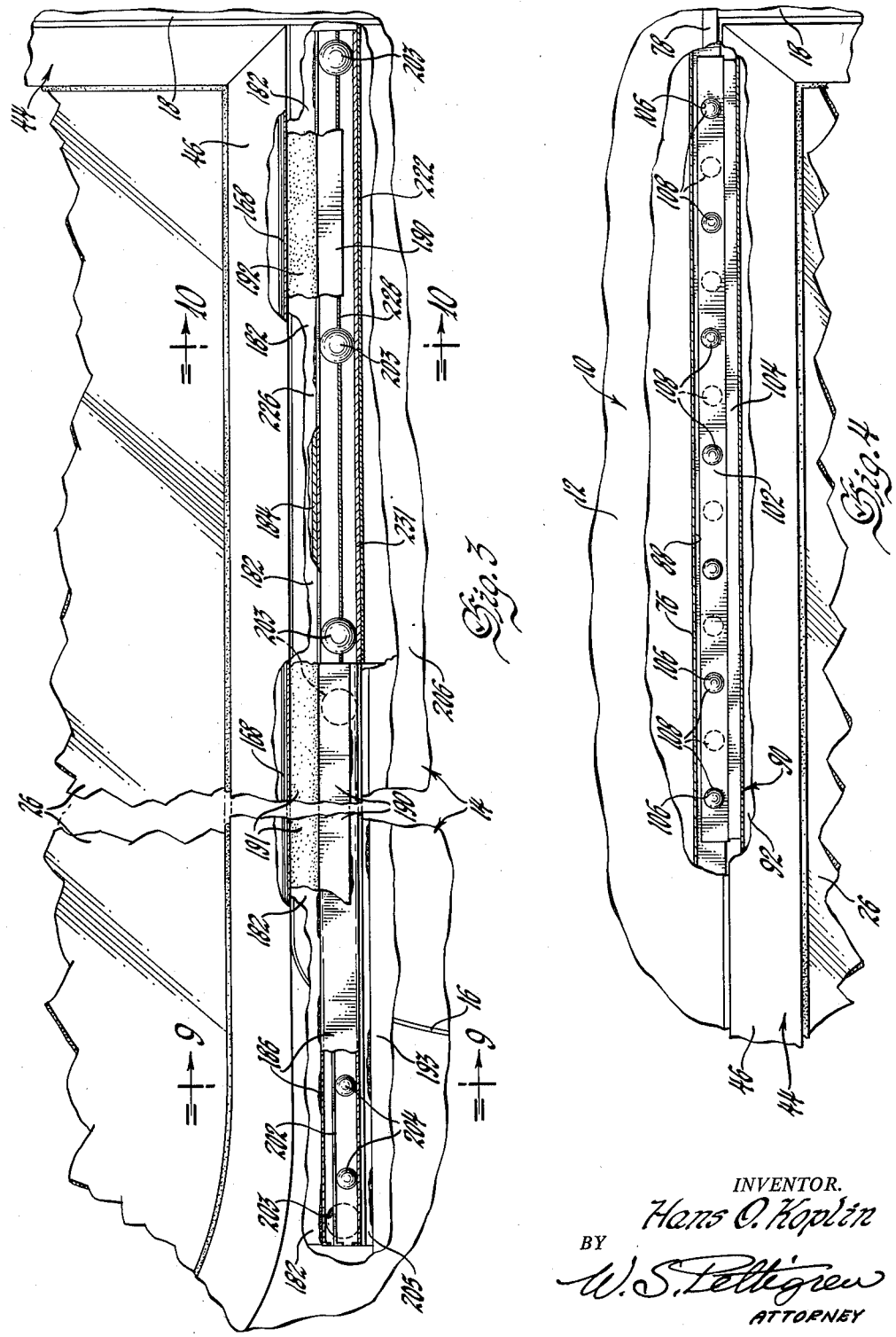

April 24, 1962  H. O. KOPLIN  3,031,223
VEHICLE BODY WITH FORWARD SLIDING WINDSHIELD
AND SIDE WINDOW STRUCTURE
Filed Oct. 20, 1958  4 Sheets-Sheet 3
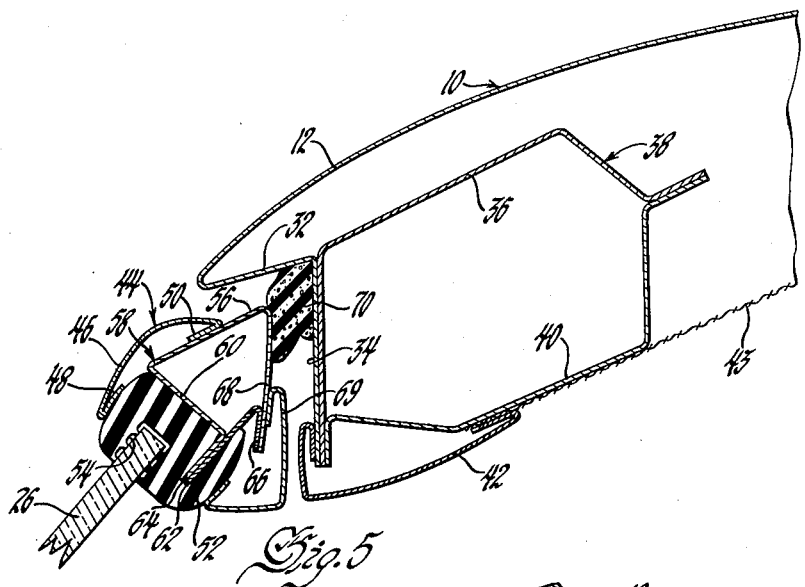
INVENTOR.
Hans O. Koplin
BY
W. S. Pettigrew
ATTORNEY April 24, 1962  H. O. KOPLIN  3,031,223
VEHICLE BODY WITH FORWARD SLIDING WINDSHIELD
AND SIDE WINDOW STRUCTURE
Filed Oct. 20, 1958  4 Sheets-Sheet 4
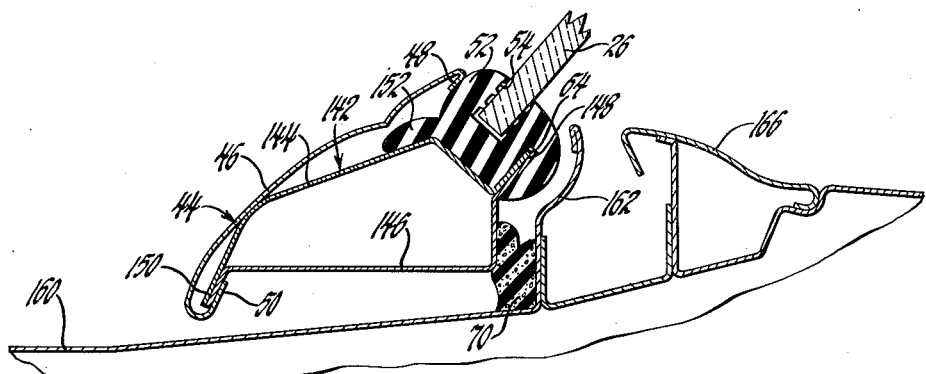
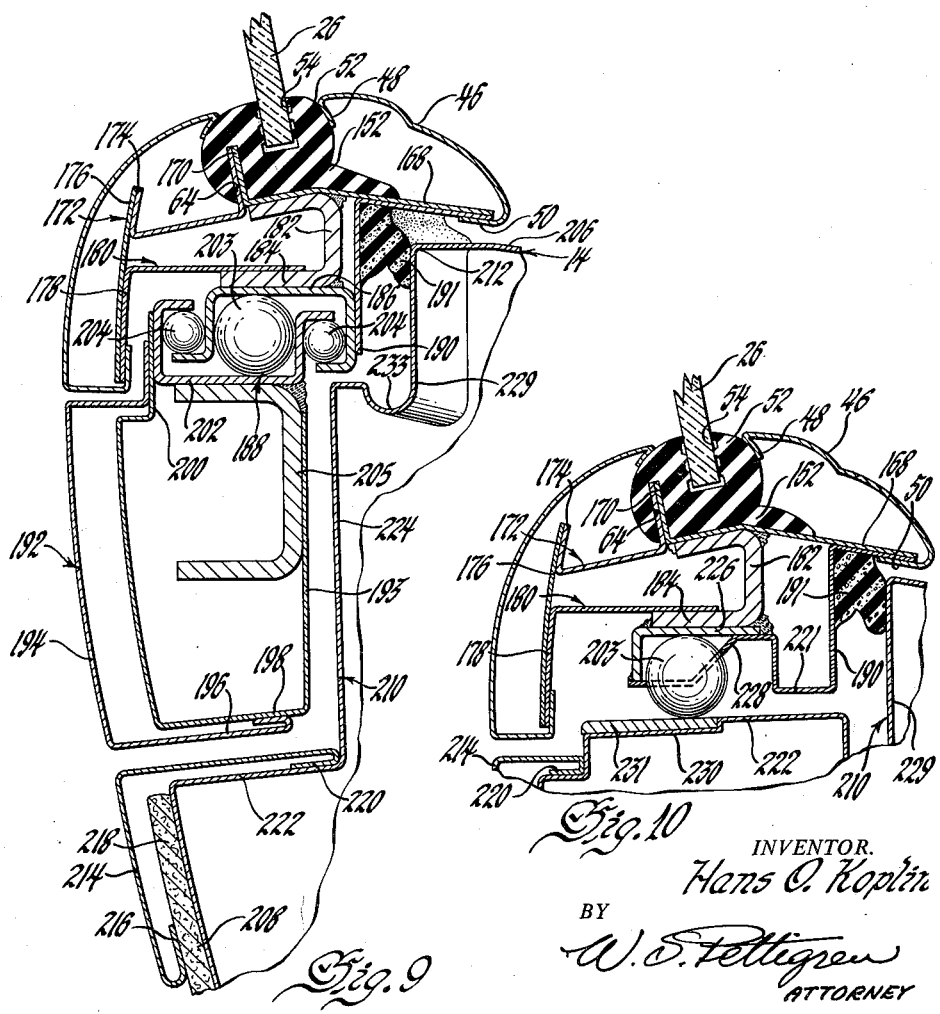
INVENTOR.
Hans O. Koplin
BY
W. S. Pettigrew
ATTORNEY United States Patent Office 3,031,223
Patented Apr. 24, 1962

3,031,223
VEHICLE BODY WITH FORWARD SLIDING
WINDSHIELD AND SIDE WINDOW STRUCTURE
Hans O. Koplin, Detroit, Mich., assignor to General Motors Corporation, Detroit, Mich., a corporation of Delaware
Filed Oct. 20, 1958, Ser. No. 768,202
2 Claims. (Cl. 296—28)

This invention relates to vehicle bodies and more particularly to vehicle body windshields.

The advent of the wrap-around windshield greatly increased the amount of unbroken vision area confronting the driver and front seat passengers since the windshield side pillars were moved rearwardly and to the sides of the body to thereby allow the windshield to partially wrap around the sides of the body. However, despite this improvement in the amount of unbroken vision area confronting the driver, the windshield pillars still provide blind spots to his vision since he is usually seated rearwardly of the pillars whereby they are still located within his overall forward vision range.

The windshield of this invention provides an unbroken vision area which is greater than the overall forward vision range of the driver whereby all blind spots to his vision are entirely eliminated both to the front and to either side of the body. Thus the windshield of this invention provides a decided improvement in vehicle body windshields.

In order to accomplish this decided improvement, the windshield of this invention wraps around the sides of the body to either side of the driver and terminates at the body center pillar or at the rear door window in the four-door sedan or hardtop types of body, respectively, or at the rear quarter window in the two-door convertible or sedan type of body. Thus, the driver has an unbroken vision area both forwardly and to either side of the body and no blind spots or obstructions are provided to his vision.

Since the windshield of this invention wraps entirely around the driver, some means must be provided in order to allow the driver or front seat passengers to enter and leave the body. This is accomplished by slidably mounting the windshield on the body so that the windshield may be bodily moved forwardly to an open position to thereby allow the driver to enter or leave the vehicle.

The primary object of this invention is to provide a new and improved vehicle body windshield which provides an unbroken vision area greater than the overall forward vision area of the driver to thereby eliminate all blind spots or obstructions to his vision. Another object of this invention is to provide an improved vehicle body windshield which wraps around either side of the body and of the driver to thereby eliminate all blind spots or obstructions to the driver's vision both forwardly and to either side of the body. A further object of this invention is to provide a new and improved vehicle body windshield which wraps around either side of the body and of the driver to thereby provide an unbroken vision area greater than the overall vision area of the driver in combination with means mounting the windshield on the body for bodily movement to a forwardly displaced position to thereby allow the driver or front seat passengers to both enter and leave the body.

These and other objects of this invention will be more readily apparent from the following specification and drawings wherein:

FIGURE 3 is an enlarged partially broken away view of a portion of FIGURE 1;

FIGURE 4 is an enlarged partially broken away view of a portion of FIGURE 1;

FIGURE 5 is an enlarged view of the upper broken away portion of FIGURE 1;

FIGURE 6 is a sectional view taken along the plane indicated generally by line 6—6 of FIGURE 1;

FIGURE 6a is a view taken along the plane indicated by line 6a—6a of FIGURE 6;

FIGURE 7 is a sectional view taken along the plane indicated generally by line 7—7 of FIGURE 1;

FIGURE 8 is an enlarged view of the lower broken away portion of FIGURE 1;

FIGURE 9 is a sectional view taken along the plane indicated generally by line 9—9 of FIGURE 3; and FIGURE 10 is a sectional view taken along the plane indicated generally by line 10—10 of FIGURE 3.

Figure 1:
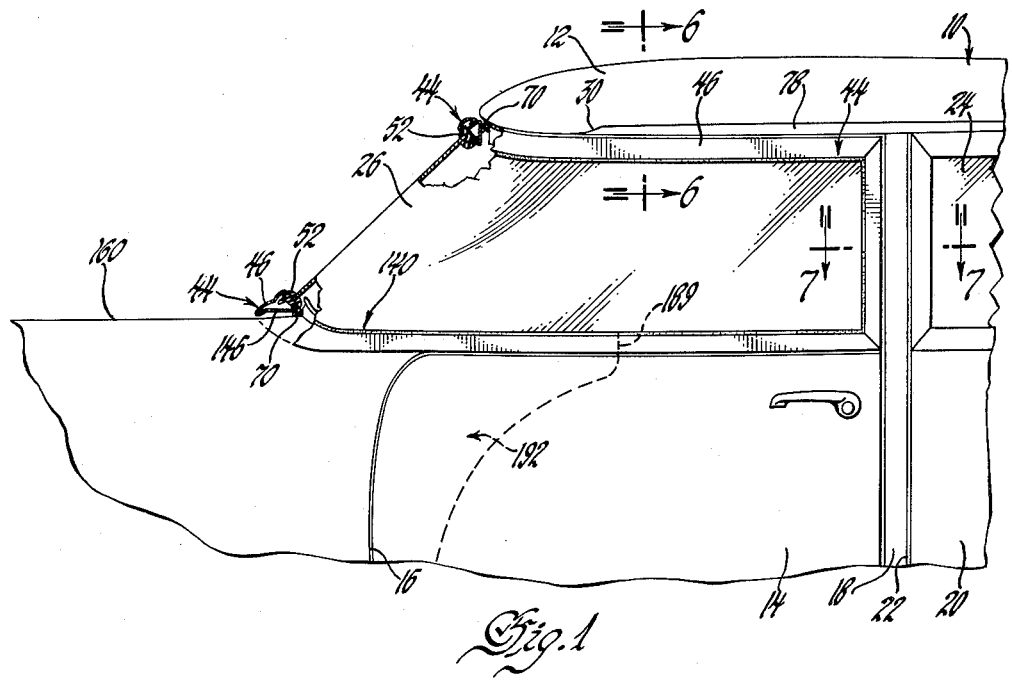
FIGURE 1 is a partially broken away partial side elevational view of a four-door sedan type of vehicle body embodying a windshield according to this invention, with the windshield being shown in closed position.
Figure 2:
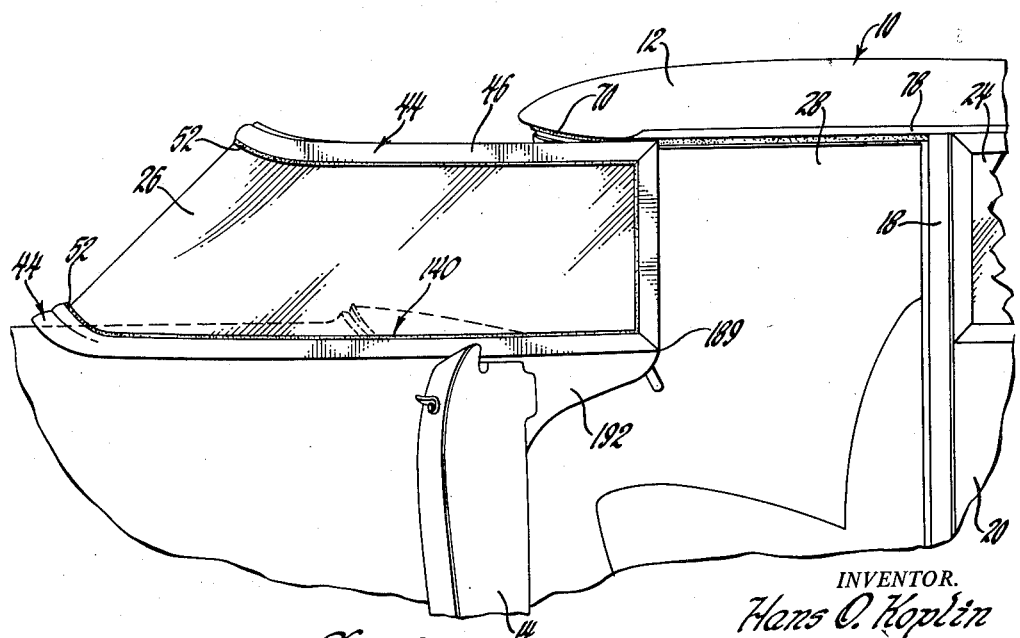
FIGURE 2 is a view similar to FIGURE 1 with the windshield being shown in a forwardly displaced open position.

Referring now particularly to FIGURE 1 of the drawings, a vehicle body 10 of the four-door sedan type includes a roof panel 12, and a front door 14 which is swingably mounted on the body at its forward edge 16 for swinging movement between a closed position as shown in FIGURE 1 and an open position as shown in FIGURE 2, with the rearward edge of the door 14 being latched in a suitable manner to the body center pillar 18. The body 10 also includes a rear door 20 which is swingably mounted at its forward edge 22 on the pillar 18 and includes a vertically movable door window 24 which is movable between a closed position as shown and an open position wherein the window is disposed within the door 20.

In order to provide an unbroken vision area which is greater than the overall forward vision area of the driver, this invention provides a continuous vehicle body windshield 26 which wraps around either side of the body and of the driver whereby no blind spots or obstructions are provided to the driver's vision both forwardly and to either side of the body. As will be hereinafter described, the windshield 26 is slidably mounted on the body 10 for movement between a closed position, as shown in FIGURE 1, and a forwardly displaced open position, as shown in FIGURE 2, to thereby allow the driver to enter and leave the body passenger compartment 28 through the vehicle front doors 14.

Since the windshield 26 and body 10 are of the same construction from the center line or longitudinal axis thereof to each side thereof, only one side will be described and it will be understood that the other side is of like construction. Referring now particularly to FIGURES 1 and 5 of the drawings, the forward arcuate edge of the roof panel 12 from a point 30 on one side of the body to a like point on the other side of the body includes an inwardly extending lateral flange 32 which merges into a depending flange 34 spotwelded to one leg of one of the channel members 36 which make up the box section windshield header 38. The legs of the other channel member 40 of the box section 38 are welded to the legs of channel member 36 at pinch-weld structures to thereby provide the box section and rigidify the forward portion of the roof panel 12. An interior garnish molding 42 is provided with bent under flanges, one bearing against and secured to one of the pinch-weld structures to conceal a portion of the box section, and the other bearing against member 40 of the box section and the usual vehicle body headlining 43, which extends rearwardly from the garnish molding 42.

As shown in FIGURES 1 and 2 of the drawing, the windshield 26 is fixedly mounted within a rigid frame 44 and the upper portion of this frame from the point 30 on one side of the body to a like point on the other side of the body will now be described. The upper portion of this frame includes an outer windshield garnish molding 46 which extends continuously around the upper edge of the windshield 26 between the rear edges thereof. As shown in FIGURE 5, the garnish molding 46 includes a pair of bent under flanges 48 and 50, with the flange 48 bearing against the windshield weatherstrip 52 which has a channel 54 frictionally receiving the upper edge portion of the windshield 26. The weatherstrip 52 is continuous around the upper, lower and rear side edges of the windshield 26.

The other flange 50 of the garnish molding 46 is secured to one leg 56 of a generally triangularly shaped structural member 58 which extends around the upper edge portion of the windshield 26 from approximately the point 30 on one side of the body to a like point on the other side of the body. The base leg 60 of the member 58 seats weatherstrip 52 and has a flange spotwelded to a reinforcing member 62 to provide a pinch-weld structure which is received within an oppositely opening channel 64 in the weatherstrip 52 to mount the weatherstrip on frame 44. Member 62 further includes a lateral flange 66 which is spotwelded to the other leg 68 of member 58 to provide another pinch-weld structure with this pinch-weld structure being secured to a bent under flange of an inner windshield garnish molding 69, the other bent under flange of which bears against the weatherstrip 52. A continuous body weatherstrip 70 which extends around the upper edge of windshield 26 is secured to the flanges 32 and 34 of panel 12 and bears against the junction between the legs 56 and 68 of the member 58 from the point 30 on one side of the body to a like point on the other side thereof to thereby provide a seal between the windshield and the body in this area.

Referring now particularly to FIGURES 1, 3 and 6 of the drawings, from the point 30 to the pillar 18, roof panel 12 terminates in an outwardly extending lateral flange 72. Flange 72 is spotwelded to a flange 74 of a channel-shaped member 76, which is a continuation of the member 40 rearwardly of the body. The lateral flange 74 of member 76 includes a further upwardly extending flange 78 which cooperates with flange 72 and roof panel 12 in providing a drain gutter for each side of the passenger compartment of the body. A channel-shaped member 80, which is a continuation of member 36 rearwardly of the body, includes a lateral flange 82 welded to the flange 74 of member 76 and also a lateral flange 84 welded to a lateral flange 86 of member 76 to provide a pinch-weld structure. The interior garnish molding 42 has one bent under flange bearing against and secured to this pinch-weld structure, and the other bent under flange bearing against the vehicle body head lining. Member 76 further includes a downwardly opening channel 88 which extends from the point 30 to pillar 18 for a purpose to be hereinafter described.

From the point 30 to pillar 18, the member 50 merges into a member 90 which includes a depending flange 92 and a channel-shaped extension 94 having a depending flange 96. The flange 92 of member 90 is spotwelded to a flange 98 of a member 100, which is a continuation of the member 62 to provide a pinch-weld structure which is received within the channel 64 of the weatherstrip 52. The outer windshield garnish molding 46 has its bent under flange 48 bearing against the weatherstrip 52 and its bent under flange 50 bearing against and secured to flange 96 of member 90. A generally square-shaped tubular guide member 102 includes a depending flange 104 which is welded to flange 92 of member 90. As shown, the member 102 is disposed with the channel 88 of member 76. Alternate circular openings 106 are cut in the opposite walls of the member 102, and ball bearings 108 rotatably mounted within the openings project outwardly into alternate engagement with the side walls of the channel 88 so as to provide a stabilizing guide for movement of the windshield 26 between open and closed positions. The body weatherstrip 70 is secured to member 76 and flange 72 thereof and seals against extension 94.

At the upper corner of the windshield 26, member 90 is joined to a structural member 112, FIGURE 7, which extends along the rear edge of windshield 26 and includes opposite laterally extending flanges 114 and 116. Flange 114 is joined to a flange 118 of another structural member 120 which is joined to the member 100. Member 120 includes a lateral forwardly extending flange 122 which is joined to a lateral flange 124 of a member 126 to provide a pinch-weld structure which is received within the channel 64 of the weatherstrip 52. Another flange of the member 126 is spotwelded to the flange 116 of member 112 to provide another pinch-weld structure. The inner windshield garnish molding 69 has one bent under flange secured to this pinch-weld structure and another bent under flange bearing against weatherstrip 52. The outer windshield garnish molding 46 has its bent under flange 48 bearing against weatherstrip 52 and its bent under flange 50 hooked over and secured to flanges 114 and 118.

As best shown in FIGURE 7, the center pillar structure 18 includes three channel-shaped members 130, 132 and 134, each of the legs of which are spotwelded together to provide a rigid structure, with the pillar 18 extending from the body floor pan to the member 76 and being rigidly secured thereto. Member 130 is rabbeted and a weatherstrip 136 which is secured to member 112 and flange 114 thereof bears against a shoulder 138 of the member 130 to seal the rear edge of the windshield 26 when in closed position.

Referring now to FIGURE 8 of the drawings, it can be seen that the lower edge of windshield 26 is received within the channel 54 of the continuous weatherstrip 52. From a point 140 on one side of the body to a point 140 on the other side thereof, the frame 44 includes a box section 142 which includes outer and inner channel-shaped members 144 and 146, respectively, the flanges 148 and 150 of which are spotwelded together to provide pinch-weld structures. The pinch-weld structure provided by flanges 148 is received within the channel 64 of the weatherstrip 52. The weatherstrip 52 is further provided with a lip 152 bearing against member 144 and extending continuously with the lower section of the weatherstrip to provide an additional seal. The outer windshield garnish molding 46 has its bent under flange 48 bearing against the weatherstrip 52 and its bent under flange 50 hooked over the pinch-weld structure provided by the flanges 150 of the box section 142. The outer cowl panel 160 of the body extends rearwardly beneath the member 146 and includes an upwardly extending flange 162 which mounts the body weatherstrip 70 to seal the windshield 26 when in closed position. The flange 162 of the outer cowl panel is joined to the instrument panel structure 166 of the body.

Referring now particularly to FIGURES 1, 4, 9, and 10 of the drawings, from the point 140 to the edge of the windshield 26, the member 144 merges into another member 168 having a lateral flange 170. Flange 170 is secured to one flange of a channel-shaped reinforcing member 172 to provide a pinch-weld structure which is received within the channel 64 of the weatherstrip 52. The member 172 is a partial continuation of the member 146, and the other lateral flange 174 of the member 172 is welded to an inner plate member 176. Plate member 176 is also welded to a flange 178 of a reinforcing member 180. A generally U-shaped reinforcing member 182 of heavy stock has one leg welded to the member 168 and the other leg 184 thereof welded to the member 180. The member 182 extends from the point 140 on the body to the rear edge of the windshield 26. The leg 184 is further welded to the upper or slidable track member 186 of a track structure 188 which extends from the point 140 to the point 189 on the body as will be further described. A reinforcing member 190 is secured to flange 168 and track member 186 and mounts a weatherstrip 191 which extends from the point 189 to the rear edge of frame 44.

Referring now particularly to FIGURES 9 and 10 of the drawings, the body front door pillar structure includes a rearwardly extending arcuately shaped portion 192 which includes an outer channel-shaped member 193 and an inner channel-shaped member 194. A flange 196 of the member 194 is welded to the base wall of the channel member 193 and flanges 200 of members 193 and 194 are welded to the lower or fixed track member 202 of the slide structure 188. The track member 186 is slidably supported on track member 202 by ball bearings 203 and 204, the former taking vertical loads and the latter taking lateral thrust loads. The member 193 is welded to the base of a heavy channel reinforcing member 205 which extends from the point 140 to the point 189, with one of the legs of the member being secured to the fixed track member 202 of the slide structure 188.

The door 14 includes a door outer panel 206 which is integral with the door inner panel 208 and is joined thereto by an intermediate door wall 210. When the door is in closed position, the shoulder 212 between the intermediate wall 210 and the outer panel 206, seals against the weatherstrip 191. A garnish molding 214 is provided for the inner upper edge portion of the door 14 and has one bent under leg 216 thereof bearing against the inner trim pad 218 and the other bent under leg 220 thereof bearing against and secured to a lateral flange 222 of wall 210.

As can be seen from a comparison from FIGURES 1, 9 and 10, the body pillar structure portion 192 terminates at the point 189 and the flanges 222 and 224 of wall 210 follow the general contour of the lower surface of the portion 192 as defined generally by the flange 198 of the member 193. Referring now particularly to FIGURE 10 of the drawings, from the point 189 to the rearward edge of the frame 44, the upper track member 186 of slide structure 188 merges into an angular flanged member 226 which is merely a continuation of the track member 186. From the point 189 to the rearward edge of the frame 44 the member 190 is provided with a channel-shaped extension 227 which merges into an offset flange 228, the end of which is secured to the member 226. Flange 228 is apertured at a number of places to provide bearing seats for rotatably retaining a plurality of ball bearings 203 which are the same as the ball bearings 203 of the track structure 188. It will be remembered that the flanges 222 and 224 of the intermediate wall 210 follow the general contour of the portion 192 of the body pillar. When this portion terminates at the point 189, the flange 224 has completely disappeared so that the flange 222 is joined to the flange 229 of wall 210 by the door drain gutter 233. From the point 189 to the rearward edge of the door 14, the flange 222 is offset at 230 and a wearplate 231 is fixedly secured to the flange within the offset, with this wearplate being slidably and rotatably engaged by the ball bearings 203 which are rotatably retained in the offset flange 228 of member 190.

From the preceding description, it can be seen that opposite upper side edge portions of the frame 44 are both guided and stabilized for horizontal movement by means of the ball bearings 108 engaging the opposite sides of the channel 88. Likewise, opposite lower side edge portions of the frame 44 are slidably supported on both the pillar portion 192 and the upper edge of the door 14 by means of the track structures 188 and the ball bearings 203 for horizontal, forward and rearward movement with respect to the upper edge portion of the door and the pillar portion 192.

Assuming now that the driver is seated within the vehicle and that the windshield is in a closed position, as shown in FIGURE 1 of the drawing, and that the driver desires to leave the vehicle. The driver will grasp the rear left hand portion of the frame 44 and move the entire windshield 26 including the frame 44 forwardly of the body as the ball bearings 203 move along the wearplates 231 and the lower track members 202, with this movement being guided by the ball bearings 108 engaging the opposite sides of the channels 88. When the windshield has been bodily displaced to its forward or open position, as shown in FIGURE 2, the driver can open the front door 14 to thereby leave the vehicle.

From a comparison of FIGURES 2, 9 and 10, it will be noted that the door 14 swings outwardly of the body or to the right as viewed in FIGURES 9 and 10 so that there is no possibility of any interference between the door and the windshield should the driver accidentally open the door when the windshield is in the closed position. After the driver has left the vehicle he can easily move the windshield 26 rearwardly to its closed position, after closing the door 14. However, if the driver happens to close the door 14 first before moving the windshield 26 rearwardly, there will be no interference between the door and the windshield if this reverse procedure takes place.

It will be understood, of course, that suitable latches are provided between the frame 44 and the pillar 18 both to the exterior and to the interior of the body so that the windshield 26 can be locked to the pillar 18 to the outside of the body when the driver has left the body and likewise can be locked to the pillar 18 from the inside of the body when the driver is seated within the body and the car is in motion.

Although the invention has been shown and described in conjunction with a four-door sedan type of body which includes a center pillar, it will be understood of course that the invention is equally applicable to a two-door sedan type of body which includes a center pillar, or to the four-door hardtop sedan type of body wherein the rear windows 24 will abut the rearward edges of the frame 44 of windshield 26, or to a convertible or two-door hardtop type of body wherein the rear quarter windows will abut the rearward edges of the frame 44 of windshield 26.

Thus, this invention provides a new and improved vehicle body windshield which provides an unbroken vision area greater than the overall forward vision area of the driver so that all blind spots or obstructions both to his forward and to his side vision are entirely eliminated. This is accomplished by providing a fully wrap around windshield which wraps around both to either side of the body and of the driver and which is slidably mounted on the body for easy movement between a closed position and the forwardly displaced or open position.

I claim:

1. The combination comprising, a vehicle body including body structure extending generally to the belt line thereof and defining a passenger compartment including a forward transverse body wall and a pair of side body walls, each side wall being provided with a door therein to provide access to the passenger compartment, roof panel structure overlying said forward and side body walls and spaced therefrom, pillar structure interconnecting said side walls and said roof panel structure at each side of said body rearwardly of said doors to define a continuous uninterrupted window opening therebetween from one of said pillars structures on one side of said body to the other of said pillar structures on the other side of said body above said side walls, said doors and said forward body wall, a unitary vehicle window fitting between said walls and said roof structure and located inwardly of the side edge portions and the forward edge portion of said roof panel structure, said window extending between said pillar structures to close said opening and provide passenger visibility both forwardly and to the sides of the body, and means mounting said window on said body for movement thereof longitudinally forwardly of the passenger compartment from underneath said roof panel structure to allow ingress and egress through said doors.

2. The combination comprising, a vehicle body including body structure extending generally to the belt line thereof and defining a passenger compartment including a forward transverse body wall and a pair of side body walls, each side body wall being provided with a door therein to provide access to the passenger compartment, roof panel structure overlying said forward and side body walls in spaced relationship thereto, a pillar structure interconnecting said roof panel structure and each of said side walls rearwardly of said doors to define a continuous window opening there-between around said body from one side to the other, a unitary vehicle window extending between said pillar structures to close said opening and provide passenger visibility both forwardly and to the sides of the body, and track means slidably mounting said window on said body for movement thereof longitudinally forwardly of said body to a position forwardly of said doors.

References Cited in the file of this patent
UNITED STATES PATENTS

| | | |
|---|---|---|
| 92,964 | Ham | July 27, 1869 |
| 1,410,970 | Veeder | Mar. 28, 1922 |
| 1,523,410 | Elliott | Jan. 20, 1925 |
| 1,717,970 | Gould | June 18, 1929 |
| 2,114,896 | Axe | Apr. 19, 1938 |
| 2,355,264 | Bloomfield | Aug. 8, 1944 |
| 2,464,696 | Lelong | Mar. 15, 1949 |
| 2,626,180 | Thompson | Jan. 20, 1953 |

FOREIGN PATENTS

| | | |
|---|---|---|
| 139,873 | Great Britain | Mar. 18, 1920 |
| 928,344 | France | June 2, 1947 |
| 1,055,507 | France | Oct. 14, 1953 |